UNITED STATES PATENT OFFICE.

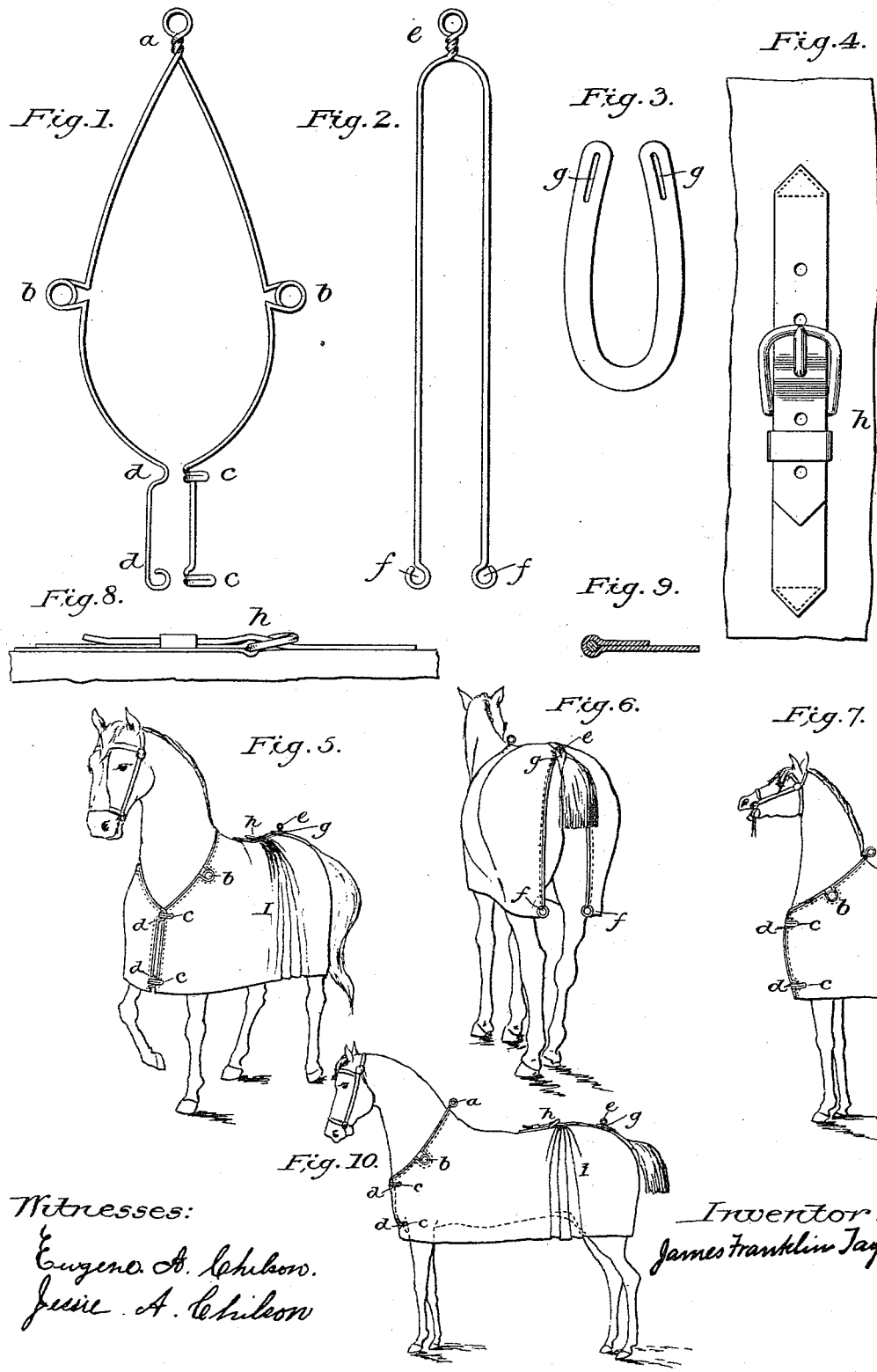

JAMES FRANKLIN TAYLOR, OF RESULT, NEW YORK.

BLANKET-HOLDER.

SPECIFICATION forming part of Letters Patent No. 458,306, dated August 25, 1891.

Application filed January 23, 1891. Serial No. 378,857. (No model.)

*To all whom it may concern:*

Be it known that I, JAMES FRANKLIN TAYLOR, a citizen of the United States, residing at Result, in the county of Greene and State of New York, have invented a new and useful Blanket-Holder, of which the following is a specification.

My invention is an appliance or instrument for fastening, securing, and holding in place horse-blankets, stable-blankets, fly-nets, and other coverings upon horses, mules, ponies, and other like animals. I attain these objects by the appliance or instrument illustrated in the accompanying drawings, in which—

Figure 1 is a collar or light frame viewed from front; Fig. 2, another light-frame used in rear of blanket, &c. Fig. 3 is a crupper; Fig. 4, a strap and buckle. Fig. 5 shows a portion of Fig. 1 fastened about the neck of a horse. Fig. 6 is a rear view of the appliance adjusted to a horse. Fig. 7 shows a side view of the collar. Fig. 8 shows side of strap and buckle. Fig. 9 shows transverse section of wire and blanket; and Fig. 10 is a longitudinal section of blanket adjusted to size of the animal.

As a detailed description, Fig. 1 represents a light, flexible, and springy collar or frame to be made in various sizes, so as to fit closely and easily the necks of different and different-sized animals for which it is intended. Said collar or frame-work is made of wire or other similar substance twisted and looped at $a$, so as to give rigidity at that point, and a post or hook for fastening the blanket. At $b$ and $b$ the wire or other substance is coiled, forming springs, adapting the collar to the varying sizes of the neck upon which it is used. $c$ and $c$ are hooks bent in the wire to hook into the eyes $d$ and $d$ when the springing collar or frame is pressed together about the neck of the animal. The tendency of the collar, by reason of its form and construction, to spring apart holds the hooks firmly in place in the eyes when once hooked into them. Said collar or frame is fastened into the blanket by stitching or rivets, or their equivalent, as shown in the transverse section of blanket and wire represented in Fig. 9.

Fig. 5 shows a portion of Fig. 1 fitted and fastened into a blanket and hooked about the neck of a horse.

Fig. 2 represents a springy frame made of the same material as that used in Fig. 1, or of similar material. The wire or other like material is twisted and formed into a loop and post or hook at $e$ to afford a point for fastening and holding the blanket, into which it is fixed in the same manner as Fig. 1 is fastened, and also presents a post or hook to which the crupper shown in Fig. 3 is fastened by means of the eyelets or holes $g$ and $g$. $f$ and $f$ of Fig. 2 represent loops in said frame, by means of which a stronger fastening to the blanket is effected, and by means of which the sides of the blanket may be fastened together when desired.

Fig. 3 represents a crupper, either round or flat, with eyelets $g$ and $g$, by means of which the crupper is fastened to the post or hook $e$. (Shown in Fig. 2.) The eyelet in one end of the crupper is placed over the post or hook $e$, the crupper passed around and under the tail of the animal, and the other end of the crupper is then hooked over the post $e$, firmly attaching the blanket to the animal and holding it securely in place.

Fig. 4 represents a strap and buckle fastened to the blanket at its middle point from side to side and just in front of the hips of the animal. By means of said strap and buckle the blanket is accurately adjusted in length to the length of the animal. The taking up of the strap in adjustment, by reason of its location, causes a fullness of the blanket over and about the hips of the animal, which in consequence has greater freedom of movement and the blanket is subjected to less strain.

Fig. 6 is a rear view of the appliance adjusted to a horse. The heavy line shows the frame of Fig. 2 with its post or hook and loops, and also the crupper shown in Fig. 3. The shape and construction of frame shown in Fig. 2 forms a spring or tension which holds the blanket or fly-net firmly and closely to the horse or other animal upon which it is used, as shown in Fig. 6.

Fig. 7 shows a side view of the collar, Fig.

1, with the spring $b\ b$ in Fig. 1 bent backward and fastened closely to the blanket or fly-net.

The dotted or broken lines in Figs. 5, 6, and 7 represent stitches or line of rivets holding the blanket or fly-net closely and firmly about collar or frame.

Fig. 8 shows side of strap and buckle fastened to the center of the blanket or fly-net in front of the animal's hips for adjusting the blanket to length of animal and for pulling and holding the crupper closely and firmly under the animal's tail. It also draws the blanket backward, securing a good fit about the neck and gathering the fullness of the blanket or fly-net where it is most needed.

Fig. 9 represents a transverse section of wire and blanket.

Fig. 10 is a sectional longitudinal view of blanket, in which view $g$ and $g$ are eyes of crupper in engagement with post $e$ of rear holder. $h$ shows contrivance for adjusting blanket or fly-net, and the irregular lines $i\ i\ i$ beneath the position of folds when blanket is adjusted to small animals.

Figures herewith shown have no comparative scale.

In use the blanket is placed upon the animal, the frames being spread apart for that purpose. Afterward the collar is pressed together about and against the neck of the animal and the hooks $c$ and $c$ inserted into the eyes $d$ and $d$. (Shown in Figs. 1 and 5.) The crupper is passed around and beneath the tail of the animal and hooked over the post $e$. (Shown in Figs. 2 and 6.) The strap shown in Fig. 4 is taken up in the buckle, so as to adjust the blanket to the length of the animal upon which it is used, and to draw the crupper closely under the animal's tail and the collar closely about the animal's neck.

What I claim is—

A horse-blanket or fly-net provided with an oval holder adapted to embrace the neck of the animal, said holder formed of wire twisted to form an eye $a$ at the top, loops $b\ b$ at the sides thereof, and a fastening of downwardly-projecting arms formed with hooks $c\ c$ and eyes or loops $d\ d$, a U-shaped frame of wire twisted to form at its apex an eye $e$ and formed with an eye $f$ at each extremity of the arms thereof, said frame adapted to hold in place the blanket or net at the rear of the animal, a crupper-strap secured to the rear holder of blanket or net and provided with eyes $g\ g$, adapted to engage the post or eye $e$ of said U-shaped frame, and an adjustable strap secured at each end to the blanket or fly-net and adapted to lie along the animal's back, whereby when said blanket or net is adjusted strain is distributed and the gathering or fullness of said blanket or net is caused to lie in front of the hips of the animal, substantially as and for the purpose described.

JAMES FRANKLIN TAYLOR.

Witnesses:
JESSIE A. CHILSON,
EUGENE A. CHILSON.